United States Patent [19]

Wada et al.

[11] 4,324,873
[45] Apr. 13, 1982

[54] ORGANOSILICON-ORGANOMETAL COMPOSITIONS AS EPOXY CURING CATALYSTS

[75] Inventors: Moriyasu Wada, Kanagawa; Shuichi Suzuki, Yokohama; Shinichi Sanada, Yokohama; Shuzi Hayase, Yokohama, all of Japan

[73] Assignee: Tokyo Shibaura Denki Kabushiki Kaisaha, Kawasaki, Japan

[21] Appl. No.: 158,456

[22] Filed: Jun. 11, 1980

[30] Foreign Application Priority Data

Jun. 21, 1979 [JP] Japan .................................. 54-77504

[51] Int. Cl.$^3$ ....................... C08G 59/68; C08G 59/70
[52] U.S. Cl. ........................................ 525/507; 528/92; 528/361; 528/367; 528/410; 528/412; 528/416; 252/426

[58] Field of Search ................. 528/92, 361, 410, 412, 528/416, 367; 525/507

[56] References Cited

U.S. PATENT DOCUMENTS

| | | | |
|---|---|---|---|
| 3,578,615 | 5/1971 | Moore et al. ..................... | 528/92 X |
| 3,657,159 | 4/1972 | Vandenberg ..................... | 528/92 X |
| 3,725,341 | 4/1973 | Rogers et al. ..................... | 528/92 X |

*Primary Examiner*—Earl A. Nielsen
*Attorney, Agent, or Firm*—Oblon, Fisher, Spivak, McClelland & Maier

[57] ABSTRACT

An epoxy resin-based compositions contain epoxy resins and a catalytic amount of curing catalysts which comprise organosilicon compounds having at least one hydroxyl group directly bonded to silicon atom and a compound having organic groups of aluminum, iron or vanadium.

18 Claims, No Drawings

ORGANOSILICON-ORGANOMETAL COMPOSITIONS AS EPOXY CURING CATALYSTS

BACKGROUND OF THE INVENTION

I. Field of the Invention:

The present invention relates to an epoxy resin-based composition and, more particularly, to an epoxy resin-based composition which rapidly cures at elevated temperatures to have various excellent characteristics.

II. Description of the Prior Art:

Epoxy resins, when cured, may exhibit various favorable physical characteristics such as good adhesiveness, as well as good mechanical, electrical and thermal characteristics. Generally, agents for curing epoxy resins may include a hardener such as polyamines, acid anhydrides, phenols or the like, and a curing catalyst such as boron trifluoride ($BF_3$) complexes, tertiary amines or the like.

Polyamines may react strongly with the epoxy resin, so that resins containing them may not be stored for long periods of time. Acid anhydrides and phenols may require high temperatures and heating for a long period of time to cure the epoxy resin. Although $BF_3$ complexes may cure the epoxy resin at relatively low temperatures, the resulting cured resin has inadequate electrical and mechanical characteristics at high temperatures. Tertiary amines requires high temperatures to cure the resin.

It has recently been proposed that a metal chelate compound be employed as a latent curing agent for epoxy resins. Chelate compounds, however, must be used in a relatively large amount and require temperatures as high as 200° C. or higher for curing epoxy resins, and a necessary catalytic amount of them do not dissolve easily in epoxy resins.

A curing method is also known in which an epoxy resin is subjected to a curing reaction using an organosilicone having a silanol group and an organic boron compound or an organic titanium compound; however the resulting cured material has impaired electrical characteristics so that it is not generally practical.

SUMMARY OF THE INVENTION

Accordingly, an object of the present invention is to provide an epoxy resin-based composition readily curable under relatively mild temperature conditions.

Another object of the present invention is to provide an epoxy resin-based composition which, when cured, has favorable electrical, thermal and mechanical characteristics.

In accordance with the present invention, there is provided an epoxy resin-based composition comprising:
an epoxy resin; and
a catalytic amount of a curing catalyst comprising;
(A) one or more organosilicon compounds having at least one hydroxyl group bonded directly to silicon atom, said organosilicon compound being selected from the group consisting of organosilanes and organosiloxanes, and
(B) at least one compound having organic groups of a metal selected from the group consisting of vanadium, aluminum and iron.

DETAILED DESCRIPTION OF THE PREFERRED EMBODIMENTS

As stated hereinabove, the epoxy resinbased composition according to the present invention contains a catalytic amount of a curing catalyst comprising (A) an organosilicon compound and (B) a metallic compound having organic groups. The term "curing catalyst" referred to herein is intended to mean an agent which functions to accelerate and complete the curing reaction of epoxy resin, but which does not in fact participate directly in the curing reaction. The catalyst does achieve this function at elevated temperatures, i.e., 100°–130° C. or higher.

The organosilicon compound (A) is selected from organosilanes and organosiloxanes having at least one hydroxyl group bonded directly to silicon atom. Preferred organosilanes are represented by the following formula:

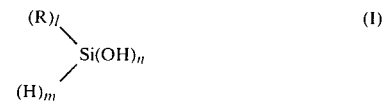

where each R is independently an alkyl group, phenyl group, an aralkyl group, vinyl group or allyl group, l is 1, 2 or 3; m is 0, 1 or 2; and n is 1, 2 or 3; provided that the sum of $l+m+n$ is 4.

When R is an alkyl group or an aralkyl group, the alkyl moiety may have up to about 20 carbon atoms, and perferably up to 5 carbon atoms. The alkyl group includes methyl, ethyl, propyl, butyl, pentyl or the like. The aralkyl group includes benzyl or the like. The group R may be substituted with a non-hydrocarbon radical excluding radicals containing an amino nitrogen; for example, a halogen or the like.

Perferred organosiloxanes may be represented by the formula:

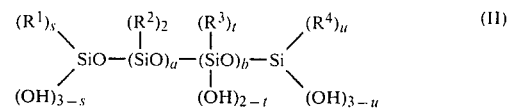

where $R^1$, $R^2$, $R^3$ and $R^4$ independently represent hydrogen atom, an alkyl group, phenyl group, vinyl group, an aralkyl group or allyl group at least one of the hydrocarbon groups being present; s and u are each 0, 1 or 2; t is 0, 1 or 2; and a and b are each 0 or 1 or an integer greater than 1.

In the formula (II), the hydrocarbon radicals (i.e., alkyl, phenyl, vinyl, aralkyl and allyl groups) are the same in the formula (I).

In the formula (II), the sum of $a+b$ is usually an integer up to 50. Further, as an organosilicon compound silicone resins having one or more SiOH radicals may be used.

The organosilicon compound (A) mentioned hereinabove may be used as a mixture of two or more of these compounds. Generally, the organosilicon compound (A) may be employed in an amount of 0.0001 to 10 percent by weight, and preferably approximately 0.01 to 5 percent by weight based on the weight of the epoxy resin used.

The other ingredient (B) of the curing catalyst in accordance with the present invention is the metallic compound having organic groups. The metal portion of the compound is aluminum, iron or vanadium. The organic portion bonded to the metal portion may be an alkoxy group, phenoxy or a substituted phenoxy group, an acyl group, an acyloxy group, a beta-dicarbonyl compound or the like. Examples of theses metallic compounds include alkoxides such as methoxide, ethoxide, isopropoxide or the like; phenoxides such as phenoxide, p-methylphenoxide or the like; acyloxy compounds such as acetate, stearate, butyrate, propionate, isopropionate or the like; chelate compounds with a ligand such as acetylacetone, trifluoroacetylacetone, pentafluoroacetylacetone, ethylacetoacetate, salicylaldehyde, diethylmalonate or the like of each of the metals.

The metallic compound (B) mentioned hereinabove may be used in admixture with one or more other abovementioned metallic compounds. The metallic compound (B) is usually employed in an amount of 0.0001 to 10 percent, perferably from 0.01 to 5 percent by weight based on the weight of the epoxy resin used.

The epoxy resin which is the major component of the composition according to the present invention is known in the art, and many are commercially available. The epoxy resin according to the present invention is not limited to a particular one and may include, for example, bisphenol A type epoxy resin; bisphenol F type epoxy resin; phenol novolak type epoxy resin; an alicyclic epoxy resin; a heterocyclic-containing epoxy resin such as triglycidyl isocyanurate or hydantoin epoxy resin; an aliphatic epoxy resin such as propylene glycol-diglycidyl ether or pentaerythritol-polyglycidyl ether; hydrogenated bisphenol A type epoxy resin; an epoxy resin obtained by reaction of an aromatic, aliphatic or alicyclic carboxylic acid with epichlorohydrin; a glycidyl ether type epoxy resin which is a reaction product of ortho-allylphenol, a novolak compound and epichlorohydrin; spiro-cyclic containing epoxy resin; a glycidyl ether type epoxy resin which is a reaction product of a diallylbisphenol compound having the allyl groups in the ortho positions to each of the hydroxyl groups of bisphenol A with epichlorohydrin, or the like. However, epoxy resins derived from N,N-diglycidyl phenylamine are not perferred.

When the curing catalysts are added to bisphenol A type epoxy resin, phenol novolak type epoxy resin or an alicyclic epoxy resin, they are particularly preferred because the epoxy resin has a greatly reduced corrosivity to metals and greatly enhanced electrical characteristics.

The epoxy resin-based compositions according to the present invention are advantageous in that they are easy to handle because they can readily be cured, for example at temperatures of 100°–130° C. or higher. The compositions are suitable for casting, immersion, or molding as solvent-free compositions by proper selection of the kind of the epoxy resin and formulation of the composition. They are also easily dissolved in a low boiling weakly polar solvent such as dioxane, tetrahydrofuran or the like, so that they may be readily employed for the formation of composite plates because they may be easily used for impregnation with or coated on glasscloth paper or the like. Furthermore, the cured resins can achieve excellent heat resistance, mechanical characteristics, and electrical insulation characteristics.

The epoxy resin-based compositions according to the present invention may contain inorganic fillers such as graphite particles.

The present invention will be more fully understood from the following examples. In the following examples and comparative examples, the units "part", "parts" and "%" are all by weight.

EXAMPLES 1 TO 3 AND COMPARATIVE EXAMPLES 1 AND 2

Three different compositions were prepared by heat-melting the epoxy resins and the curing catalysts in the amounts indicated in Table 1.

The composition of Example 1 gelled at 100° C. in 60 minutes and at 150° C. in 10 minutes. The composition of Example 2 gelled at 100° C. in 10 minutes and at 120° C. in 4 minutes. The composition of Example 3 gelled at 100° C. in 30 minutes and at 150° C. in 12 minutes.

Each of the above compositions was heated at 120° C. for 2 hours and then at 150° C. for 5 hours to obtain a pale orange, transparent and tough cured product. Their various characteristics are shown in Table 1.

For comparison, two compositions were prepared by heat-melting an epoxy resins and a conventional curing agent in the amounts indicated in Table 1. The various characteristics of these comparative compositions, when cured at 100° C. for 2 hours and at 150° C. for 5 hours for Comparative Example 1 and at 100° C. for 2 hours and at 150° C. for 4 hours for Comparative Example 2, respectively, are shown in Table 1.

TABLE 1

| Ingredients | Composition (Parts) | | | | |
|---|---|---|---|---|---|
| | Example 1 | Example 2 | Example 3 | Comparative Ex. 1 | Comparative Ex. 2 |
| Epoxy Resins | | | | | |
| Epikote 828[1] | 100 | — | — | 100 | 100 |
| Chissonox 221[2] | — | 100 | — | — | — |
| Epichlon 830[3] | — | — | 100 | — | — |
| Curing Catalyst of the Present Invention | | | | | |
| Diphenylsilane diol | — | 0.05 | — | — | — |
| SH 6018[4] | 2 | — | 1 | — | — |
| Al (acac)$_3$[5] | 1 | 0.05 | 0.4 | — | — |
| Conventional Curing Agent | | | | | |
| BF$_3$—EtNH$_2$[6] complex | — | — | — | 3 | — |
| 2 PHZ—CN[7] | — | — | — | 3 | 10 |
| Heat Distortion Temperature[8] (°C.) | 175 | 163 | 161 | 135 | 140 |
| Volume Resistivity (Ω . cm) at 25° C. | $1.8 \times 10^{18}$ | $2.3 \times 10^{18}$ | $3.2 \times 10^{17}$ | $7.8 \times 10^{15}$ | $8.2 \times 10^{15}$ |

TABLE 1-continued

| Ingredients | Example 1 | Example 2 | Example 3 | Comparative Ex. 1 | Comparative Ex. 2 |
|---|---|---|---|---|---|
| at 150° C. | $2.6 \times 10^{16}$ | $3.2 \times 10^{16}$ | $1.7 \times 10^{15}$ | $3.2 \times 10^{8}$ | $5.3 \times 10^{10}$ |
| at 25° C. after boiling for 1 hour | $1.7 \times 10^{18}$ | $2.1 \times 10^{16}$ | $2.9 \times 10^{17}$ | $1.2 \times 10^{12}$ | $1.9 \times 10^{15}$ |
| Dissipation Factor[9] (%) | | | | | |
| at 25° C. | 0.30 | 0.43 | 0.42 | 0.62 | 0.78 |
| at 150° C. | 0.83 | 1.28 | 1.58 | 24.3 | 15.8 |
| at 220° C. | 4.40 | 4.05 | 8.10 | >40 | >40 |
| Bending Strength[10] (kg/mm) | | | | | |
| at 25° C. | 13.1 | 15.6 | 10.3 | 8.7 | 9.9 |
| at 150° C. | 7.2 | 9.5 | 6.3 | 2.4 | 4.1 |
| Weight loss (%) after heating at 250° C. for 500 hours | 4.2 | 12.7 | 11.6 | 35.6 | 21.5 |

Note:
[1] Trade Mark of Shell Chem. Corp.'s bisphenol A/epichlorohydrin type epoxy resin represented by the formula:

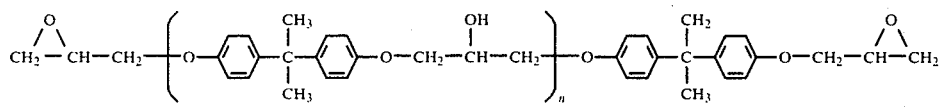

(n ≃ approx. 0) and having an average molecular weight of approximately 380.

[2] Trade mark of alicyclic epoxy resin (product of Chisso K.K.) represented by the formula:

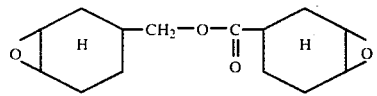

[3] Trade mark of novolak type epoxy resin (product of Dainippon Ink & Chemicals, Inc.) having the formula:

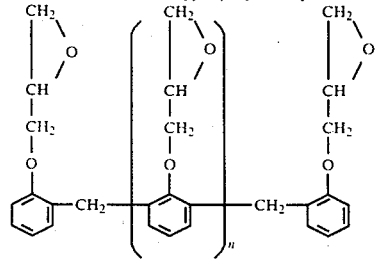

(n ≃ approx. 0)

[4] Trade mark of polymethylphenyl siloxane (Toray Silicon K.K.) having a molecular weight of approximately 1,600 and an OH equivalent of approximately 400.
[5] Aluminum triacetylacetonate
[6] Boron trifluoride-monoethylamine complex
[7] Trade mark of imidazole compound (product of Shikoku Kasei K.K.)
[8] According to ASTM 684(a)
[9] According to JIS K-6911
[10] According to JIS K-7203

EXAMPLE 4

A composition was prepared by heat-melting 100 parts of Epikote 828, 2 parts of SH 6018 and 1 part of irontriacetylacetonate. This composition gelled at 100° C. in 70 minutes and at 150° C. in 12 minutes. When cured at 120° C. for 2 hours and then at 150° C. for 5 hours, this composition yielded a reddish orange, transparent, and tough cured product.

EXAMPLE 5

A composition was prepared by heat-melting a mixture of 100 parts of Epikote 828, 2 parts of SH 6018, and 1 part of vanadium-triacetylacetonate. This composition gelled at 100° C. in 90 minutes and at 150° C. in 15 minutes. This composition yielded a pale yellow, transparent and tough cured product when cured at 120° C. for 2 hours and then at 150° C. for 5 hours.

EXAMPLE 6

A mixture of 400 parts of Shodain 540 (Trade mark of diglycidyl hexahydrophthalate epoxy resin manufactured by Showa Denko K.K.), 800 parts of Epikote 1001 (Trade mark of bisphenol A/epichlorohydrin type epoxy resin manufactured by Shell Chemical Corp. having the formula shown in Note 1 of Table 1 above wherein n is approximately 2 and having a molecular weight of about 900), 1500 parts of Epikote 152 (Trade mark of novolak epoxy resin manufactured by Shell Chemical Corp. having the formula shown in Note 3 of Table 1 above wherein n is approximately 1) and 100 parts of SH-6018 was dissolved in methyl ethyl ketone at 100° C. to provide a solution having 55% solids. To this solution were added 2.6 parts of aluminum triethylacetoacetate and 2.6 parts of TSR-160 (Trade mark of polymethylphenylsiloxane manufactured by Toshiba Silicon K.K. having 4-5% OH groups), and the combination was mixed to provide a solution.

The resulting solution was used to impregnate a plain weave glass cloth pretreated with epoxysilane and air dried, and then the impregnated cloth was dried at 100° C. for 10 to 30 minutes to provide a prepreg. The prepreg was found to have approximately 45% solids.

Eight 200×200 mm sheets were cut from the prepreg and superposed to give a composite plate by pressing at 180° C. for 30 minutes and then post-curing at 180° C. for 5 hours. Several test specimens were cut away and measured for weight loss and electrical characteristics. The weight loss on heating at 200° C. for 1,000 hours was found to be 11%, and the electrical characteristics are shown in Table 2.

TABLE 2

| Test Items | Measuring Conditions | Measured Value |
| --- | --- | --- |
| Volume resistivity ($\Omega$ . cm) | Room Temperature | $>10^{15}$ |
|  | 180° C. | $6.3 \times 10^{12}$ |
| Dissipation Factor (%) | Room Temperature | 0.7 |
|  | 180° C. | 7.9 |

EXAMPLE 7

Admixture of of 100 parts of Chissonox 221, 200 parts of Araldite ECN 1299 (Trade mark of an ortho-cresol-novolac polyglycidyl ether epoxy resin represented by a formula:

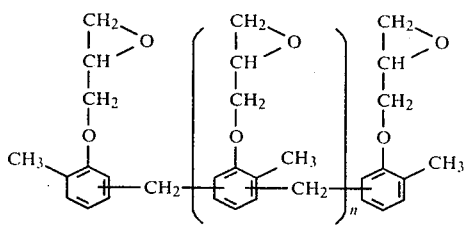

and having an epoxy equivalent of 235, manufactured by Chiba Geigy) and 3 parts of SH-6018 was homogeneously dissolved in methyl ethyl ketone at 50° to 60° C. to provide a solution having 50% solids. To 120 parts of this solution were gradually added 0.3 part of aluminum triethylacetoacetate and 40 parts of natural graphite powders having an average particle size of 55μ, and the combination was stirred to give a composition for molding. This solution was filtered under reduced pressure to remove the solvent and was then placed in a mold having a temperature of 180° C. and subjected to a pressure of 180 kg/cm² to provide a plate. After this plate was post-cured at 200° C., its friction coefficient μ was measured by means of an EFM-II-B Type Friction Abrasion Machine (Toyo Baldwin K.K.) and found to be 0.23 under a load of 100 kg. At this time, the exothermal temperature was 165° C. and the PV value was 4,100.

EXAMPLE 8

To a mixture of 40 parts of Epikote 828 and 60 parts of Epikote 807 (Trade mark of a bisphenol F/epichlorohydrine type epoxy resin represented by a formula:

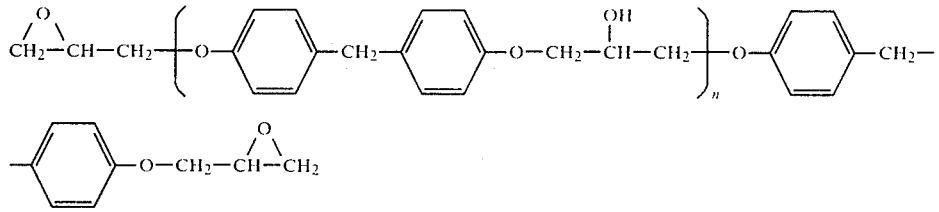

(where n is approximately 0), manufactured by Shell Chemicals) were added 3 parts of diphenylmethylsilanol and 2 parts of Al (acac)$_3$. The mixture was heat cured at 160° C. for 15 hours to provide a resin plate. Its dissipation factor (tan δ) was 0.56% at 130° C., 1.71% at 150° C. and 3.10% at 180° C.

As a comparison, the above procedure was followed except that 3 parts of BF$_3$-EtNH$_2$ complex was employed in place of the silanol and Al(acac)$_3$ to provide a resin plate. Its dissipation factor (tan δ) was measured to be 20.5% at 130° C. and was immeasurably high at 150° C. and above.

EXAMPLE 9

To a mixture of 80 parts of Epikote 828 and 20 parts of Epikote 1001 were added 3 parts of phenyldiethylsilanol and 1 part of aluminum isopropoxide (hereinafter referred to as Al-Oipr); the resultant mixture was heat cured at 160° C. for 15 hours to provide a resin plate. This plate had a dissipation factor δ of 0.63% at 130° C., 2.03% at 150° C. and 2.91% at 180° C.

As is apparent from the above-mentioned Examples and Comparative Examples, the resin-based compositions according to the present invention are suitable for use as insulating materials for electrical appliances or the like, such as composite plates, molding materials, prepregs, binding tapes, wedges, shaft bearing materials or the like, because they are suitable for use in impregnation and casting and they are soluble in weakly polar organic solvents with low boiling points.

What is claimed is:

1. An epoxy resin-based composition, comprising:
   an epoxy resin; and
   a catalytic amount of a curing catalyst comprising:
   (A) at least one organosilicon compound selected from the group consisting of R$_l$H$_m$Si(OH)$_n$, wherein R is independently alkyl, phenyl, aralkyl, vinyl, or allyl, l is 1, 2 or 3, m is 0, 1 or 2 and n is 1, 2 or 3 provided the sum of l+m+n is 4 and

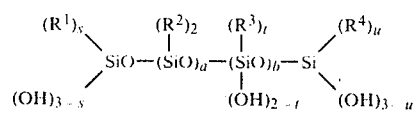

wherein R$^1$, R$^2$, R$^3$ and R$^4$ are each, independently, alkyl, phenyl, vinyl, aralkyl or allyl, at least one of the hydrocarbon radicals being present, s and u are each 0, 1 or 2; t is 0, 1 or 2; and a and b are each 0, 1 or an integer greater than 1; and (B) at least one organometal compound selected from the group consisting of alkoxide, phenoxide, acyloxide, and chelate compounds of vanadium, aluminum, and iron, and mixtures thereof.

2. An epoxy resin-based composition, comprising:
an resin; and
a catalytic amount of a curing catalyst comprising:
(A) at least one organosilicon compound having at least one hydroxyl group bonded directly to silicon, said organosilicon compound being selected from the group consisting of organsilanes and organosiloxanes; and
(B) at least one compound selected from the group consisting of alkoxide, phenoxide, acyloxide and chelate compounds of vanadium, aluminum and iron, and mixtures thereof.

3. A composition according to claim 2, wherein the organosilicon compound (A) is selected from organosilanes represented by the formula:

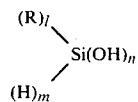

wherein R is independently an alkyl, phenyl, aralkyl, vinyl or allyl group, l is 1, 2 or 3, m is 0, 1 or 2, and n is 1, 2 or 3, provided that the sum of l+m+n is 4.

4. A composition according to claim 3, wherein the organosilane is diphenylsilane diol, diphenylmethylsilanol, phenyldiethysilanol or a mixture thereof.

5. A composition according to claim 2, wherein the organosilicon compound (A) is an organosiloxane represented by the formula:

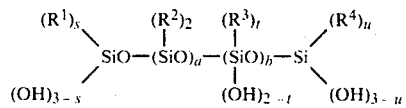

wherein $R^1$, $R^2$, $R^3$ and $R^4$ are each, independently, an alkyl, phenyl, vinyl, an aralkyl or allyl, at least one of the hydrocarbon radicals being present; s and u are each 0, 1 or 2; t is 0, 1 or 2; and a and b are each 0, 1 or an integer greater than 1.

6. A composition according to claim 5, wherein the sum of a and b is 50 or less.

7. A composition according to claim 2, wherein the metal is aluminum.

8. A composition according to claim 7, wherein the compound (B) is aluminum triacetylacetonate, aluminum triethylacetoacetate, aluminum isopropoxide or a mixture thereof.

9. A composition according to claim 2, wherein the metal is iron.

10. A composition according to claim 9, wherein the compound (B) is iron triacetylacetonate.

11. A composition according to claim 2, wherein the metal is vanadium.

12. A composition according to claim 11, wherein the compound (B) is vanadium triacetylacetonate.

13. A composition according to claim 1 or 2, wherein the epoxy resin is selected from the group consisting of bisphenol A type epoxy resin, bisphenol F type epoxy resin, phenol novolak type epoxy resin, alicyclic epoxy resin, heterocyclic-containing epoxy resin, epoxy resin obtained by reaction of an aromatic, aliphatic or alicyclic carboxylic acid with epichlorohydrin, spirocyclic containing epoxy resin, glycidyl ether type epoxy resin obtained by reaction of ortho-allylphenol novolak compound with epichlorohydrin, and glycidyl ether type epoxy resin obtained by reaction of diallylbisphenol compound having the allyl groups in the ortho positions with each of the hydroxyl groups of bisphenol A.

14. A composition according to claim 3, 4, 5, 6, 7, 8, 9, 10, 11, 12, 1 or 2, wherein the curing catalyst comprises the organosilicon compound (A) in an amount of 0.0001 to 10 percent by weight and the compound (B) in an amount of 0.001 to 10 percent by weight, each based on the weight of the epoxy resin.

15. A composition according to claim 14, which is diluted with a relatively weakly polar organic solvent with a low boiling point.

16. A composition according to claim 15, comprising an inorganic filler.

17. A composition according to claim 1, wherein said organosilicon compound is said organosilane.

18. A composition according to claim 1, wherein said organosilicon compound is said organosiloxane.

* * * * *

UNITED STATES PATENT AND TRADEMARK OFFICE
CERTIFICATE OF CORRECTION

PATENT NO.   : 4,324,873

DATED        : April 13, 1982

INVENTOR(S)  : Moriyasu Wada et. al.

It is certified that error appears in the above—identified patent and that said Letters Patent is hereby corrected as shown below:

On the title page,
Please correct the Assignment to read as follows:

[73] -- Assignee:   TOKYO SHIBAURA DENKI KABUSHIKI KAISHA,

Kawasaki-shi, Japan --

Signed and Sealed this

Twenty-seventh Day of July 1982

[SEAL]

Attest:

GERALD J. MOSSINGHOFF

Attesting Officer

Commissioner of Patents and Trademarks